(12) United States Patent
Hashimoto et al.

(10) Patent No.: US 9,932,703 B2
(45) Date of Patent: Apr. 3, 2018

(54) CARBON FIBER SIZING AGENT, CARBON FIBER STRAND, AND FIBER-REINFORCED COMPOSITE

(71) Applicant: MATSUMOTO YUSHI-SEIYAKU CO., LTD., Yao-shi, Osaka (JP)

(72) Inventors: Yoshio Hashimoto, Yao (JP); Yusuke Shimizu, Yao (JP); Mikio Nakagawa, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 374 days.

(21) Appl. No.: 14/342,775

(22) PCT Filed: Oct. 15, 2012

(86) PCT No.: PCT/JP2012/076564
§ 371 (c)(1),
(2) Date: Mar. 4, 2014

(87) PCT Pub. No.: WO2013/058200
PCT Pub. Date: Apr. 25, 2013

(65) Prior Publication Data
US 2014/0227516 A1 Aug. 14, 2014

(30) Foreign Application Priority Data
Oct. 21, 2011 (JP) .................. 2011-231860

(51) Int. Cl.
| | | |
|---|---|---|
| *D06M 15/63* | (2006.01) | |
| *D06M 15/263* | (2006.01) | |
| *D06M 15/507* | (2006.01) | |
| *D06M 15/55* | (2006.01) | |
| *D06M 15/568* | (2006.01) | |
| *C08J 5/24* | (2006.01) | |
| *D06M 101/40* | (2006.01) | |

(52) U.S. Cl.
CPC ............ *D06M 15/63* (2013.01); *C08J 5/24* (2013.01); *D06M 15/263* (2013.01); *D06M 15/507* (2013.01); *D06M 15/55* (2013.01); *D06M 15/568* (2013.01); *C08J 2300/22* (2013.01); *D06M 2101/40* (2013.01); *Y10T 428/2918* (2015.01)

(58) Field of Classification Search
None
See application file for complete search history.

(56) References Cited

U.S. PATENT DOCUMENTS

| | | | |
|---|---|---|---|
| 4,474,906 A | 10/1984 | Nakama et al. | |
| 4,806,586 A * | 2/1989 | Nakai | ........ C08K 3/34 523/212 |
| 2004/0197565 A1 | 10/2004 | Sugiura et al. | |
| 2008/0236443 A1 | 10/2008 | Salsman | |
| 2008/0242783 A1* | 10/2008 | Ganesan | ........ C08G 63/19 524/413 |
| 2009/0062426 A1* | 3/2009 | Shiraki | ........ C08F 255/02 523/205 |
| 2009/0123767 A1* | 5/2009 | Gohil | ........ B32B 27/10 428/458 |
| 2010/0159243 A1 | 6/2010 | Inoue | |
| 2011/0136951 A1 | 6/2011 | Kitano et al. | |
| 2013/0289222 A1 | 10/2013 | Salsman | |

FOREIGN PATENT DOCUMENTS

| | | |
|---|---|---|
| CN | 1701148 A | 11/2005 |
| CN | 101117377 A | 2/2008 |
| CN | 101636255 A | 1/2010 |
| CN | 101679622 A | 3/2010 |
| CN | 101925639 A | 12/2010 |
| CN | 101967225 A | 2/2011 |
| JP | 56-135547 A | 10/1981 |
| JP | 58-126375 A | 7/1983 |
| JP | 60-088062 A | 5/1985 |
| JP | 06-107442 A | 4/1994 |
| JP | 09-217281 A | 8/1997 |
| JP | 2003-165849 A | 6/2003 |
| JP | 2003-166174 A | 6/2003 |
| JP | 2003-336129 A | 11/2003 |
| JP | 2005-042220 A | 2/2005 |
| JP | 2009-001954 A | 1/2009 |
| JP | 2011-231414 A | 11/2011 |
| WO | 2009-093748 A1 | 7/2009 |

OTHER PUBLICATIONS

Office Action of the corresponding Chinese Patent Application No. 201280051642.3, dated Feb. 3, 2015.
JIS Handbook of Plastics I, K7121; Testing Methods for Transition Temperatures of Plastics, published on Jan. 31, 2002, Japan.
JIS Handbook of Plastics, K7122; Testing Methods for Heat of Transitions of Plastics., published on Jan. 31, 2002, Japan.

* cited by examiner

*Primary Examiner* — Chinessa T Golden

(57) ABSTRACT

A carbon fiber sizing agent imparts good bonding performance to carbon fiber, is used to reinforce a thermoplastic matrix resin, and provides a carbon fiber strand applied with the sizing agent and a fiber-reinforced composite reinforced with the carbon fiber strand. The sizing agent for carbon fiber is used to reinforce thermoplastic matrix resin. The sizing agent essentially contains a polymer component having a glass transition temperature of at least 20 deg.C. and exhibits no endothermic peaks indicating an endothermic heat of fusion due to crystalline melting of at least 3 J/g in a determination with a DSC. The weight ratio of the polymer component is 10 to 100 wt % of the nonvolatile components of the sizing agent. The polymer component is at least one component selected from the group consisting of an aromatic polyester resin, aromatic polyester-polyurethane resin and amine-modified aromatic epoxy resin.

18 Claims, No Drawings

CARBON FIBER SIZING AGENT, CARBON FIBER STRAND, AND FIBER-REINFORCED COMPOSITE

TECHNICAL FIELD

The present invention relates to a sizing agent for carbon fiber employed in reinforcement of thermoplastic matrix resin, and a carbon fiber strand and fiber-reinforced composite manufactured therewith. More precisely, the present invention relates to a carbon fiber sizing agent which imparts good bonding performance to a carbon fiber strand with a thermoplastic matrix resin, and a carbon fiber strand and fiber-reinforced composite manufactured therewith.

TECHNICAL BACKGROUND

Fiber-reinforced composites manufactured by reinforcing plastic materials (called matrix resins) with various synthetic fibers are used widely in automotive application, aviation and space application, sporting and leisure goods application, and general industrial use. Fibers employed for the composites include inorganic fibers, such as carbon fiber, glass fiber and ceramic fiber; and organic fibers, such as aramid fiber, polyamide fiber and polyethylene fiber. These synthetic fibers are usually produced into filament, and later processed into various forms of reinforcement textiles, including a sheeted intermediate material called unidirectional prepreg which is manufactured by applying hot melt resin to fabric and winding it onto a drum, a textile material manufactured by filament winding, woven fabric or chopped fiber.

Reinforcement fibers are often used in a form of chopped fiber cut into 1 to 15 mm long for manufacturing fiber-reinforced composites of thermoplastic resins, such as polyolefin resins, nylon resins, polycarbonate resins, polyacetal resins, ABS resins, polyphenylene sulfide resins and polyetherimide resins, which are included in the matrix resins mentioned above and attract attention because of their good moldability and advantages in recycling. The chopped fiber should have sufficient cohesion when it is knead with a thermoplastic resin to be manufactured into pellets, and chopped fiber having insufficient cohesion cannot be fed constantly to pellet manufacturing. In addition, reinforcement fiber strands having insufficient fiber cohesion sometimes break to deteriorate the properties of resultant fiber-reinforced composites. For preventing such troubles, numbers of techniques for coating reinforcement fibers with sizing agents containing various thermoplastic resins as a base component have been proposed in order to impart optimum cohesion to the reinforcement fibers (see JPA 58-126375, JP A 60-88062, JP A 2003-165849, JP A 2005-42220 and JP A 2009-1954) and widely employed in industrial fields.

On the other hand, reinforcement fibers are increasingly processed into a form called filament pellet or into a unidirectional sheet, tape or fabric to be impregnated with thermoplastic resins and molded in subsequent processes similarly to composite materials of thermosetting resins, in order to effectively achieve desirable properties of reinforcement fibers including tensile strength. In such cases, hot-melt thermoplastic resins should rapidly penetrate into fiber strands, specifically, fill space between single fibers in molding fiber-reinforced composites in order to shorten the molding time and improve the physical properties of resultant composites.

However, thermoplastic matrix resins including inherently nonpolar polyolefin resins are more viscous than thermosetting resins in molten form, and sometimes fail to sufficiently impregnate fiber strands applied with sizing agents disclosed in prior arts due to insufficient wettability on the fiber strands. Thus the resultant composites sometimes have mechanical properties insufficient for meeting demands for composites.

Under such situation, a sizing agent which improves the affinity between sized fiber and matrix resin to firmly bond the fiber and resin has been demanded in the field of fiber-reinforced composites of thermoplastic matrix resins including polyolefin resins.

DISCLOSURE OF INVENTION

Technical Problem

With the view of the conventional technical background, the present invention aims to provide a sizing agent which imparts excellent bonding performance to carbon fiber used to reinforce thermoplastic matrix resins, and a carbon fiber strand and fiber-reinforced composite manufactured therewith.

Technical Solution

The inventors of the present invention diligently studied to solve the problem mentioned above, and attained the present invention with the finding that a carbon fiber sizing agent containing a polymer component having specific properties can solve the problem.

Specifically, the carbon fiber sizing agent of the present invention is applied to carbon fiber used for reinforcing thermoplastic matrix resins, and essentially contains a polymer component which has a glass transition temperature of at least 20 deg. C. and does not exhibit an endothermic peak indicating an endothermic heat of fusion due to crystalline melting of 3 J/g or more in a determination with a differential scanning calorimeter (DSC). The polymer component constitutes 10 to 100 wt % of the nonvolatile components of the sizing agent.

The polymer component is at least one component selected from the group consisting of an aromatic polyester resin, aromatic polyester-polyurethane resin and amine-modified aromatic epoxy resin.

The aromatic polyester-polyurethane resin is a polymer produced by addition polymerization of an aromatic polyester polyol and polyisocyanate.

The amine-modified aromatic epoxy resin is a reaction product of an aromatic epoxy compound and hydroxyl-group-containing amine compound in which the ratio of the hydroxyl-group-containing amine compound ranges from 1.0 to 2.0 mol equivalent to the epoxy groups of the aromatic epoxy compound.

The sizing agent of the present invention should preferably further contain a modified polyolefin resin. The polymer component should preferably constitute from 10 to 90 wt % and the modified polyolefin resin should preferably constitute from 10 to 90 wt % of the non-volatile components of the sizing agent.

The thermoplastic matrix resin should preferably be a polyolefin resin.

Further, the sizing agent for carbon fiber of the present invention should preferably contain water and the polymer component should preferably be in a state dispersed or dissolved in the water.

The aromatic polyester resin should preferably have a hydrophilic group in its molecular framework, and the aromatic polyester-polyurethane resin should preferably have a hydrophilic group in its molecular framework.

The carbon fiber strand of the present invention includes a base fiber strand, and the sizing agent for carbon fiber applied to the base carbon fiber strand The fiber-reinforced composite of the present invention includes a thermoplastic matrix resin and the carbon fiber strand.

Advantageous Effects

The carbon fiber sizing agent of the present invention can impart a good bonding performance to carbon fiber used to reinforce a thermoplastic matrix resin.

The carbon fiber strand applied with the carbon fiber sizing agent of the present invention has an excellent performance to bond with a thermoplastic matrix resin. The carbon fiber strand of the present invention can be processed into a fiber-reinforced composite having excellent properties.

BEST MODE FOR CARRYING OUT THE INVENTION

The present invention provides a sizing agent for carbon fiber used to reinforce thermoplastic matrix resins. The sizing agent essentially contains a specific polymer component in a specified amount. The present invention is described below in detail.

[Polymer Component]

The carbon fiber sizing agent of the present invention essentially contains a polymer component which has a glass transition temperature of at least 20 deg. C. and does not exhibit an endothermic peak indicating an endothermic heat of fusion due to crystalline melting of 3 J/g or more in a determination with a differential scanning calorimeter (DSC).

The glass transition temperature mentioned in the present invention is indicated by the intersection of the line drawn on the equidistant points between two lines each extended from the upper and lower baselines and the slope connecting the upper and lower base lines, where the base lines and the slope appear on the DSC curve of the polymer component determined with a DSC according to JIS K 7121 as described below.

The endothermic heat of fusion due to crystalline melting mentioned in the present invention is defined to be the value (in the unit of J/g) calculated from the value of integral of the area surrounded by an endothermic peak appearing on a DSC curve and a line between the points at which the peak starts from and returns to the base line, where the endothermic peak curve is determined in the method with a DSC according to JIS K7121 and JIS K7122 mentioned later.

The glass transition temperature of the polymer component should be at least 20 deg.C. for the purpose of controlling the mobility of the polymer molecules and forming strong interfacial layer between a sized fiber and matrix resin to improve bonding strength between the sized fiber and matrix resin. The glass transition temperature of the polymer component should preferably range from 25 to 200 deg.C. and more preferably from 30 to 150 deg.C.

Further, the polymer component of the present invention should not exhibit an endothermic peak indicating an endothermic heat of fusion due to crystalline melting of 3 J/g or more. In other words, the polymer component of the present invention should exhibit no endothermic peaks due to crystalline melting, or should exhibit an endothermic peak indicating an endothermic heat of fusion of less than 3 J/g (no peaks of 3 J/g or more). Although the reason of such value of the endothermic heat of fusion has not been clarified, it can be estimated as follows.

In the crystalline region of a typical crystalline polymer where polymer chains are regularly arranged, the intermolecular force decreases with increasing polymer temperature and the state of the polymer rapidly changes from solid to liquid. The change in the physical state of the polymer can be detected in a determination with DSC as a significant endothermic peak indicating an endothermic energy of 3 J/g or higher. If the physical state of a polymer component in a sizing agent changes rapidly in such wise, the change may cause the dissolution and diffusion of the components of the sizing agent into the hot melt matrix resin in molding the composite, and thus the sizing agent may not contribute to the bonding between the sized carbon fiber and matrix resin.

On the contrary, the polymer component of the present invention changes from solid to liquid under heating slower than the typical crystalline polymers mentioned above. Thus it is estimated that a sizing agent containing the polymer component remains enough on a sized fiber surface while the composite is molded and improves the bonding between the sized fiber and matrix resin.

The polymer component of the present invention should preferably not exhibit an endothermic peak indicating an endothermic heat of fusion due to crystalline melting of 2 J/g or more (i.e., exhibit no endothermic peaks due to crystalline melting or exhibit an endothermic peak indicating an endothermic heat of fusion due to crystalline melting of less than 2 J/g), more preferably not exhibit an endothermic peak indicating an endothermic heat of fusion due to crystalline melting of 1 J/g or more (i.e., exhibit no endothermic peaks due to crystalline melting or exhibit an endothermic peak indicating an endothermic heat of fusion due to crystalline melting of less than 1 J/g), and further more preferably exhibit no endothermic peaks.

The polymer component should not exhibit an endothermic peak indicating an endothermic heat of fusion due to crystalline melting of 3 J/g or more within the temperature range of 300 deg.C. from the end point of the glass transition of the polymer component.

Further the polymer component of the present invention should not exhibit an exothermic peak due to polymer crystallization in a determination with a DSC as well as it should not exhibit an endothermic peak due to crystalline melting as mentioned above.

The polymer component of the present invention is not specifically restricted so far as it has the properties mentioned above, and should preferably be at least one polymer selected from the group consisting of an aromatic polyester resin, aromatic polyester-polyurethane resin and amine-modified aromatic epoxy resin. The polymer component of the present invention can be produced by selecting monomers and controlling their ratio in the production of the resins. One of or a combination of at least two of the polymer components of the present invention can be used.

[Aromatic Polyester Resin]

The aromatic polyester resin is a copolymer of a polycarboxylic acid or its anhydride and a polyol, and at least one of the polycarboxylic acid, its anhydride and a polyol is a polymer containing an aromatic compound. The aromatic polyester resin should preferably have a hydrophilic group in its molecular framework including the chain end in order to be self-emulsifiable, because a sizing agent of the present invention containing such resin can be made into an aqueous emulsion without emulsifiers such as surfactants. The hydrophilic groups include, for example, polyalkylene oxide groups, sulfonate salts, carboxyl groups and their neutralization salts. The copolymer can be produced in known methods.

The examples of the polycarboxylic acid are aromatic dicarboxylic acids, sulfonate salt-containing aromatic dicarboxylic acids, aliphatic dicarboxylic acids, alicyclic dicarboxylic acids and polycarboxylic acids having at least three functional groups.

The aromatic dicarboxylic acids include phthalic acid, terephthalic acid, isophthalic acid, orthophthalic acid, 1,5-naphthalene dicarboxylic acid, 2,6-naphthalene dicarboxylic acid, diphenyl dicarboxylic acid, diphenoxyethane dicarboxylic acid and phthalic anhydride.

The sulfonate salt-containing aromatic dicarboxylic acids include sulfoterephthalate salt and 5-sulfoisophthalate salt.

The aliphatic dicarboxylic acids and alicyclic dicarboxylic acids include fumaric acid, maleic acid, itaconic acid, succinic acid, adipic acid, azelaic acid, sebacic acid, dimer acid, 1,4-cyclohexane dicarboxylic acid, succinic anhydride and maleic anhydride.

The polycarboxylic acids having at least three functional groups include trimellitic acid, pyromellitic acid, trimellitic anhydride and pyromellitic anhydride.

The examples of the polyol are diols and polyols having at least three functional groups.

The diols include ethylene glycol, diethylene glycol, polyethylene glycol, propylene glycol, polypropylene glycol, polybutylene glycol, 1,3-propane diol, 1,4-butane diol, 1,6-hexane diol, neopentyl glycol, tetramethylene glycol, 1,4-cyclohexane diol, 1,4-cyclohexane dimethanol, resorcin, hydroquinone, bisphenol A and their alkylene oxide adducts.

The polyols having at least three functional groups include trimethylol propane, glycerin and pentaerythritol.

For producing the aromatic polyester resin of the present invention which has a glass transition temperature of at least 20 deg.C. and does not exhibit an endothermic peak indicating an endothermic heat of fusion due to crystalline melting of 3 J/g or more in a determination with a DSC, at least one of the polycarboxylic acid, its anhydride (both of which may be sometimes collectively referred to as all of the polycarboxylic acid components) and the polyol should preferably contain an aromatic compound. Further, an aromatic dicarboxylic acid as the aromatic compound should constitute preferably from 40 to 99 mole percent, more preferably from 80 to 99 mole percent, of all of the polycarboxylic acid components. For making stable aqueous emulsion of the polyester copolymer resin, a sulfonate salt-containing aromatic dicarboxylic acid should constitute preferably 1 to 10 mole percent of all of the polycarboxylic acid components. Of those polycarboxylic acids and polyols exemplified above, phthalic acid, terephthalic acid, isophthalic acid, orthophthalic acid, 1,5-naphthalene dicarboxylic acid, 2,6-naphthalene dicarboxylic acid, diphenyl dicarboxylic acid, diphenoxyethane dicarboxylic acid, phthalic anhydride, sulfoterephthalate salt, and 5-sulfoisophthalate salt are preferable polycarboxylic acids; and ethylene glycol, diethylene glycol, polyethylene glycol, propylene glycol, tetramethylene glycol and neopentyl glycol are preferable polyols.

The weight-average molecular weight of the polyester copolymer resin should preferably range from 3,000 to 100,000, and more preferably from 10,000 to 30,000. A polyester copolymer resin having a weight-average molecular weight of less than 3,000 has poor heat resistance while a polyester copolymer resin having a weight-average molecular weight of greater than 100,000 is made into unstable aqueous emulsion.

[Aromatic Polyester-Polyurethane Resin]

The aromatic polyester-polyurethane resin is a polymer produced by addition polymerization of an aromatic polyester polyol and polyisocyanate. The aromatic polyester-polyurethane resin should preferably have a hydrophilic group in its molecular framework including the chain end in order to be self-emulsifiable, because a sizing agent of the present invention containing such resin can be made into an aqueous emulsion without emulsifiers such as surfactants. The examples of the hydrophilic group are polyalkylene oxide groups, sulfonate salts, carboxyl groups and their neutralization salts. The polymer can be produced in known methods.

The aromatic polyester polyol is a copolymer of a polycarboxylic acid or its anhydride and a polyol, and at least one of the polycarboxylic acid, its anhydride and the polyol contains an aromatic compound. The polycarboxylic acid, its anhydride and the polyol include the compounds exemplified in the description of the aromatic polyester resin.

The examples of the polyisocyanate are 2,4-tolylene diisocyanate, 2,6-tolylene diisocyanate, tetramethylene diisocyanate, hexamethylene diisocyanate, xylylene diisocyanate, isophorone diisocyanate and 1,5-naphthalene diisocyanate.

For producing the aromatic polyester-polyurethane resin of the present invention, which has a glass transition temperature of at least 20 deg.C. and does not exhibit an endothermic peak indicating an endothermic heat of fusion due to crystalline melting of 3 J/g or more in a determination with a DSC, at least one of the polycarboxylic acid, its anhydride and the polyol should preferably contain an aromatic compound. Further, an aromatic dicarboxylic acid as the aromatic compound should constitute preferably from 40 to 100 mole percent, and more preferably from 80 to 100 mole percent of the polycarboxylic acid or its anhydride. Preferable combinations of the polycarboxylic acid and polyol are the same as that mentioned in the description of the aromatic polyester resin. The examples of the preferable polyisocyanate are 2,4-tolylene diisocyanate, 2,6-tolylene diisocyanate, xylylene diisocyanate, isophorone diisocyanate, and 1,5-naphthalene diisocyanate.

The weight-average molecular weight of the aromatic polyester-polyurethane resin should preferably range from 3,000 to 100,000, and more preferably from 10,000 to 50,000. An aromatic polyester-polyurethane resin having a weight-average molecular weight less than 3,000 has poor heat resistance while an aromatic polyester-polyurethane resin having a weight-average molecular weight greater than 100,000 is made into unstable aqueous emulsion.

[Amine-Modified Aromatic Epoxy Resin]

The amine-modified aromatic epoxy resin is a reaction product of an aromatic epoxy compound having an aromatic ring in its molecular framework and having at least one epoxy group, and a hydroxyl-group-containing amine compound. The amine-modified aromatic epoxy resin is soluble in water.

The examples of the aromatic epoxy compound include polyglycidyl ether compounds of mononuclear polyphenols, such as hydroquinone, resorcinol and pyrocatechol; and polyglycidyl ether compounds of polynuclear polyphenols, such as dihydroxynaphthalene, biphenol, bisphenol F, bisphenol A, phenol novolac, ortho-crezol novolac, resorcinol novolac, bisphenol F novolac, bisphenol A novolac and dicyclopentadiene-modified phenol. The epoxy equivalent of the aromatic epoxy compound should range from 150 to 2500 g/eq, preferably from 300 to 1500 g/eq and more preferably from 400 to 800 g/eq, and the weight-average molecular weight of the aromatic epoxy compound should range from 300 to 5000, preferably from 500 to 3000 and more preferably from 800 to 1500, for controlling the glass transition temperature of the resultant amine-modified aromatic epoxy resin and optimizing the water-solubility of the resin.

The preferable hydroxyl-group-containing amine compound is a primary or secondary amine having a hydroxyl group in its molecule, and the examples of such amine are monoethanol amine, monopropanol amine, diethanol amine, methyl ethanol amine, ethyl ethanol amine and dipropanol amine.

For producing the amine-modified aromatic epoxy resin of the present invention, bisphenol A diglycidyl ether should preferably be selected from the aromatic epoxy compounds and diethanol amine should preferably be selected from the hydroxyl-group-containing amine compounds.

The amine-modified aromatic epoxy resin is produced in a method in which an aromatic epoxy compound is heated to its softening point or a higher temperature to be turned into molten state and reacted with a hydroxyl-group-containing amine compound dropped into the aromatic epoxy compound with agitation. Then water is gradually added to the reaction product to dissolve the product into an aqueous solution. If the molten aromatic epoxy compound is excessively viscous, solvents such as alcohols, cellosolves or ketones may optionally be added to the molten compound. If the product after the reaction with a hydroxyl-group-containing amine has poor water-solubility, carboxylic acids such as formic acid, acetic acid, propionic acid and lactic acid may be added to the product for forming salts which function to improve the water-solubility of the product.

The ratio of the hydroxyl-group-containing amine compound to the aromatic epoxy compound in the reaction should preferably range from 0.5 to 2.5 mole equivalent, more preferably from 0.5 to 2.0 mole equivalent, and further more preferably from 1.0 to 2.0 mole equivalent to the epoxy groups of the aromatic epoxy compound. The ratio of the hydroxyl-group-containing amine compound of lower than 0.5 mole equivalent may cause insufficient water-solubility of the resultant reaction product while the ratio of the hydroxyl-group-containing amine compound of greater than 2.0 mole equivalent may result in excessive amount of unreacted hydroxyl-group-containing amine compound which causes insufficient bonding performance of sized carbon fiber.

[Modified Polyolefin Resin]

Further the carbon fiber sizing agent of the present invention should preferably contain a modified polyolefin resin. The polyolefin resin improves the compatibility between the polymer component, which is the essential component of the sizing agent of the present invention, and a matrix resin, especially in the case that a polyolefin resin is employed for the matrix resin, and thus further improves bonding between sized carbon fiber and the matrix resin.

The modified polyolefin resin is a copolymer of an olefin monomer, such as ethylene and propylene, and a monomer copolymerizable with an olefin monomer, such as unsaturated carboxylic acid; and can be produced in a known method. The modified polyolefin resin may be a random copolymer produced by copolymerizing an olefin monomer and unsaturated carboxylic acid, or a graft copolymer produced by graft-copolymerizing an olefin monomer and unsaturated carboxylic acid.

The examples of the olefin monomer include ethylene, propylene and 1-butene, and one of or a combination of at least two of the olefin monomers may be employed. The examples of the monomer copolymerizable with an olefin monomer include unsaturated carboxylic acids, such as acrylic acid, methacrylic acid, maleic acid, maleic anhydride, itaconic acid and fumaric acid, and one of or a combination of at least two of the monomers may be employed.

For copolymerizing the olefin monomer and the monomer copolymerizable with the olefin monomer, the olefin monomer and the monomer copolymerizable with the olefin monomer should preferably constitute from 80 to 99.5 wt % and from 0.5 to 20 wt % respectively of the 100 wt % of the sum of those polymers, more preferably from 90 to 99 wt % and from 1 to 10 wt % respectively, and further more preferably from 95 to 98 wt % and from 2 to 5 wt % respectively. An amount of olefin monomer less than 80 wt % may lead to poor compatibility of the resultant sizing agent to a matrix resin. An amount of the olefin monomer greater than 99.5 wt % may result in a sizing agent which inhibits the bonding between sized carbon fiber and a matrix resin, or a sizing agent poorly dispersed in water which is difficult to be uniformly applied to carbon fiber.

The modifier group, such as carboxy group, introduced by copolymerization into the modified polyolefin resin of the present invention should preferably be neutralized with a basic compound. The examples of the basic compound include metallic salts such as sodium hydroxide and potassium hydroxide; ammonia; and amines such as lauryl amine, ethylene diamine, trimethyl amine, dimethyl ethanol amine, dibutyl ethanol amine, monoethanol amine, diethanol amine, triethanol amine, monopropanol amine, dipropanol amine and monobutanol amine. Of those compounds, amines are preferable and diethanol amine is more preferable.

The weight-average molecular weight of the modified polyolefin resin of the present invention should preferably range from 5000 to 200000, and more preferably from 50000 to 150000. A modified polyolefin resin having a weight-average molecular weight less than 5000 has poor heat resistance while a modified polyolefin resin having a weight-average molecular weight greater than 200000 may be poorly dispersed in water.

The modified polyolefin resin is apt to exhibit distinct crystalline melting point, i.e., the resin exhibits an endothermic peak indicating an endothermic energy of fusion due to crystalline melting 3 J/g or more in a determination with a DSC, and rapidly changes into solid to liquid in heating. Thus the modified polyolefin resin applied alone to a carbon fiber as a sizing agent often dissolves and disperses rapidly in a matrix resin in molding a carbon fiber-reinforced composite without contributing to the bonding between the sized carbon fiber and the matrix resin.

If the polymer component, which is the essential component of the sizing agent of the present invention and slowly changes from solid to molten state in heating, coexists with the modified polyolefin resin on carbon fiber, the components of the sizing agents including the modified polyolefin resin can remain on or near carbon fiber surface during the molding of a carbon-fiber reinforced composite without excessively dissolving or dispersing in the matrix resin and contribute to the bonding between the carbon fiber and matrix resin.

[Sizing Agent]

In the carbon fiber sizing agent of the present invention applied to carbon fiber for reinforcement of thermoplastic matrix resins, the ratio of the polymer component ranges from 10 to 100 wt % of the nonvolatile components of the sizing agent. A sizing agent containing the polymer component of less than 10 wt % causes dissolution and dispersion of the components in a matrix resin during the molding of a carbon fiber-reinforced composite not to contribute to the bonding between the carbon fiber and the matrix resin.

In the sizing agent containing the modified polyolefin resin, the ratio of the polymer component and the modified polyolefin resin to the nonvolatile components of the sizing agent should preferably range from 10 to 90 wt % and from 10 to 90 wt % respectively, more preferably from 25 to 75 wt % and from 25 to 75 wt % respectively, and further more preferably from 40 to 60 wt % and from 40 to 60 wt % respectively, in order to improve the compatibility of the sizing agent to a matrix resin and bonding between a sized carbon fiber and matrix resin. The polymer component and modified polyolefin resin blended in those ratios prevent the dissolution and dispersion of the components of the sizing agent into a heated molten matrix resin in molding a carbon fiber-reinforced composite, form strong interfacial layer having good bonding performance to the matrix resin between the carbon fiber and the matrix resin, and thus achieve good bonding between the sized carbon fiber and matrix resin. The nonvolatile components mentioned here is the absolute dry matter remaining after heating the sizing agent at 105 deg.C. to remove solvents until constant weight.

The sizing agent of the present invention may be applied to fiber from dispersion or solution in organic solvents, such as acetone or methylethyl ketone. However, the sizing agent should preferably contain water, in other words, it should preferably be made into an aqueous dispersion or aqueous solution in which the polymer component and the modified polyolefin resin are dispersed or dissolved, for the safety of workers using the sizing agent, prevention of disasters including fires, and prevention of the pollution in natural environment.

In an aqueous dispersion of the sizing agent of the present invention, the average particle size of the dispersed sizing agent should preferably be 5 μm or smaller, more preferably 3 μm or smaller, and further more preferably 1 μm or smaller. An aqueous dispersion containing the particles of the sizing agent having a particle size of greater than 5 μm may not be practical because the sizing agent cannot be applied uniformly on reinforcement fiber and the dispersion is not stable during storage.

The average particle size mentioned here is the average value calculated from the particle size distribution determined with a laser diffraction/scattering particle size distribution measurement apparatus (LA-910, produced by Horiba, Ltd.).

The method for making the aqueous dispersion or solution of the sizing agent of the present invention is not specifically restricted and known methods can be employed. Those methods include, for example, a method in which each of the components constituting the sizing agent is added to warm water with agitation to be dispersed, emulsified or dissolved, and a method in which each of the components are mixed, heated to a temperature above their softening points, agitated in a homogenizer, mixer or ball mill with mechanical shear and emulsified through phase conversion by gradually adding water.

The aqueous dispersion or solution mentioned above may contain a solvent other than water, such as an organic solvent, in an amount which will not adversely affect the advantage of the aqueous dispersion or solution, for the convenience in handling the dispersion or solution in carbon fiber manufacturing process and for improved stability of the dispersion or solution during storage.

The organic solvent include alcohols such as methyl alcohol, ethyl alcohol and isopropyl alcohol; glycols and glycol ethers such as ethylene glycol, propylene glycol, ethylene glycol monoisopropyl ether and ethylene glycol monobutyl ether; and ketones such as acetone and methylethyl ketone. The amount of the organic solvent, which depends on the variant of the solvent, should preferably be not greater than 100 wt % and more preferably not greater than 50 wt % of the amount of the nonvolatile components of the sizing agent in order not to adversely affect the advantage of the aqueous dispersion or solution.

The concentration of the nonvolatile components of the sizing agent of the present invention produced in a form of an aqueous dispersion or solution is not specifically restricted, and selected according to the ingredients of the nonvolatile components in order to make stable aqueous dispersion having a viscosity convenient for handling and use. The concentration of the nonvolatile components should preferably be at least 10 wt %, more preferably range from 20 to 60 wt %, and further more preferably from 30 to 50 weight percent, considering the transportation cost of the sizing agent.

Other than the components described above, the components constituting the sizing agent of the present invention include surfactants, lubricants, antioxidants, flame retarders, antiseptics, crystal-nucleation agents and antifoam agents. One of or a combination of at least two of those components can be employed.

Of those components, the surfactants function as emulsifiers for water-insoluble or poorly water-soluble resins contained in the sizing agent of the present invention, and efficiently emulsify the resins in water. The ratio by weight of the surfactants should preferably range from 5 to 40 wt %, more preferably from 10 to 30 wt %, and further more preferably from 15 to 25 wt % of the nonvolatile components of the sizing agent.

The surfactants are not specifically restricted and can be selected from known surfactants including nonionic surfactants, anionic surfactants, cationic surfactants and amphoteric surfactants. One of or combination of at least two of the surfactants can be employed.

The nonionic surfactants include, for example, nonionic surfactants of alkylene oxide adducts produced by adding an alkylene oxide (which can be a combination of at least two alkylene oxides) such as ethylene oxide or propylene oxide to higher alcohols, higher fatty acids, alkyl phenols, styrenated phenols, benzyl phenol, sorbitan, sorbitan ester, castor oil and hydrogenated castor oil; adducts produced by adding higher fatty acids to polyalkylene glycols; and ethylene oxide-propylene oxide copolymers.

The anionic surfactants include, for example, carboxylic acids, carboxylate salts, sulfate salts of higher alcohols and higher alcohol ethers, sulfonate salts, and phosphate salts of higher alcohols and higher alcohol ethers.

The cationic surfactants include, for example, cationic surfactants of quaternary ammonium salts such as lauryl trimethyl ammonium chloride, oleyl methylethyl ammonium ethosulfate, etc.; and cationic surfactants of amine salts such as polyoxyethylene laurylamine lactate salt, etc.

The amphoteric surfactants include, for example, amino acid type amphoteric surfactants such as sodium laurylamino propionate, etc.; and betaine type amphoteric surfactants such as stearyl dimethyl betaine, lauryl dihydroxyethyl betaine, etc.

[Carbon Fiber Strand]

The carbon fiber strand of the present invention is produced by applying the carbon fiber sizing agent to a base carbon fiber strand and used for reinforcing a thermoplastic matrix resin.

The method for producing the carbon fiber strand of the present invention includes the sizing step where the sizing agent is applied to a base carbon fiber strand and the carbon fiber applied with the sizing agent is dried.

The method for applying the sizing agent to a base carbon fiber strand is not specifically restricted and any known methods including kiss roll method, dipping with rollers, and spraying can be employed. Of those methods, dipping with rollers is preferable because of uniform size application on the base carbon fiber strand.

The drying method for the sized carbon fiber strand is not specifically restricted, and the sized carbon fiber strand can be heated and dried with heater rollers, hot airs, or hot plates.

For applying the sizing agent of the present invention to a base carbon fiber strand, all of the components of the sizing agent can be blended before applying to the base carbon fiber strand, or the components can be separately applied to the base carbon fiber strand at two or more steps. Furthermore, thermosetting resins such as epoxy resins, vinyl ester resins and phenol resins and/or thermoplastic resins other than the polymer components employed in the present invention such as polyurethane resins, polyester resins, nylon resins and acrylate resins can be applied to the base carbon fiber strand in an amount which does not deteriorate the effect of the present invention.

The carbon fiber strand of the present invention is used as a reinforcement fiber for a composite containing a thermoplastic resin as the matrix. The form of the reinforcement fiber may be continuous filament or short fiber cut into a desirable length.

The amount of the nonvolatile components in the sizing agent applied to a base carbon fiber strand can be optionally selected to impart desirable performance to the sized carbon fiber strand according to each requirement. The preferable amount of the nonvolatile components ranges from 0.1 to 20 wt % of a base carbon fiber strand. For applying the sizing agent to a continuous carbon fiber strand, the amount of the nonvolatile components should preferably range from 0.1 to 10 wt %, and more preferably from 0.5 to 5 wt % of the base carbon fiber strand. For applying the sizing agent to a carbon fiber strand cut into a desirable length, the amount of the nonvolatile components should preferably range from 0.5 to 20 weight percent, and more preferably from 1 to 10 weight percent of the carbon fiber strand.

Insufficient amount of the sizing agent on carbon fiber may fail to achieve the effect of the present invention for the impregnation of the sized carbon fiber with a matrix resin and the bonding between the sized carbon fiber and the matrix resin. Further insufficient amount of the sizing agent on carbon fiber strand may fail to impart sufficient cohesion to the carbon fiber strand to cause poor handling property of the fiber strand. On the other hand, excessive amount of the sizing agent on carbon fiber strand is not preferable, because such sized carbon fiber strand may become too rigid and have poor handling property, and may be impregnated insufficiently with matrix resins in molding fiber-reinforced composites.

[Fiber-Reinforced Composite]

The fiber-reinforced composite of the present invention contains a thermoplastic matrix resin and the carbon fiber strand mentioned above as the reinforcement fiber. The carbon fiber strand applied with the sizing agent of the present invention has good affinity to a thermoplastic matrix resin and is manufactured into fiber-reinforced composite in which the carbon fiber and the matrix resin are bonded firmly.

The matrix resin of the present invention may contain one or at least two thermoplastic resins. The thermoplastic matrix resin is not specifically restricted, and the examples of the thermoplastic matrix resin include polyolefin resins, nylon resins, polycarbonate resins, polyester resins, polyacetal resins, ABS resins, phenoxy resins, polymethyl methacrylate resins, polyphenylene sulfide resins, polyetherimide resins and polyether ketone resins. Of those thermoplastic resins, polyolefin resins are preferable for their good bonding with carbon fiber applied with the sizing agent of the present invention. The part or whole of the thermoplastic matrix resin can be modified for the purpose of improving the bonding between the matrix resin and carbon fiber strand.

The manufacturing method of the fiber-reinforced composite is not specifically restricted, and various known methods including injection molding with compounds containing chopped fiber or filament pellet, pressure molding with UD (unidirectional) sheet or fabric sheet, and molding with wound filament.

The amount of carbon fiber strand contained in a fiber-reinforced composite is not specifically restricted and can be selected according to the variant and form of carbon fiber and the variant of thermoplastic matrix resins. The amount of carbon fiber strand contained in a fiber-reinforced composite should preferably range from 5 to 70 weight percent, and more preferably from 20 to 60 weight percent of the resultant fiber-reinforced composite.

EXAMPLES

The present invention is specifically explained with the following examples, though the present invention is not restricted within the scope of the examples. The percent mentioned in the following examples means "wt % (weight percent)" unless otherwise specified. The properties were measured in the methods described below.

[Glass Transition Temperature]

The glass transition temperature of about 10 mg of a sample was determined with a differential scanning calorimeter (DSC, the Jade DSC Lab system, manufactured by PerkinElmer Instruments) according to JIS K 7121 with elevating temperature at the rate of 10 deg.C./min. Specifically, a sample was accurately weighed to 10±1 mg and set in the differential scanning calorimeter, and the sample was heated under the elevating temperature up to the temperature 30 deg.C. higher than the melting temperature of the sample previously determined. Then the temperature of the sample was lowered to the temperature 50 deg.C. lower than the glass transition temperature, Tg, of the sample previously determined, and then raised to 300 deg.C. at the rate of 10 deg.C./min. The resultant DSC curve contained a stepwise shift, and two lines were extended from each of the upper and lower baselines drawn on the both ends of the stepwise shift of the DSC curve.

The glass transition temperature, Tg (deg.C.), of the sample was indicated by the intersection of the line formed of the equidistant points between the two extended lines and the stepwise shift of the DSC curve.

[Endothermic Heat of Fusion]

According to JIS K 7121 and JIS K 7122, the endothermic heat of fusion (Jig) of a sample was calculated from the value of the integral of the area surrounded by the endothermic peak on the DSC curve of the sample obtained in the determination of the glass transition temperature and the line drawn between the two points on the baseline of the DSC curve where the endothermic peak starts from one of the points and returns to the other.

[Bonding]

The bonding between a carbon fiber strand and matrix resin was measured in a microdroplet method with an evaluation equipment for the interfacial properties of composite materials, HM 410 (manufactured by Tohei Sangyo Co., Ltd.).

Carbon fiber filament was sampled from each of the carbon fiber strands produced in Examples and Comparative examples, and set in the evaluation equipment for the interfacial properties of composite materials. A drop of molten 90:10 mixture of J-900GP (a polypropylene resin, produced by Idemitsu Petrochemical Co., Ltd.) and Umex 1010 (produced by Sanyo Chemical Industries, Ltd.) was placed on the carbon fiber filament set in the equipment. The carbon fiber filament with the drop of the resin was taken out of the equipment and cooled down well at room temperature to be prepared into a sample for determining the bonding between the carbon fiber filament and the resin. The cooled sample was again set in the equipment and the drop was pinched with the blades of the equipment. Then the carbon fiber filament in the equipment was driven at a speed of 0.06 mm/min to determine the maximum pullout load, F, required for pulling out the drop from the carbon fiber filament.

The interfacial shearing strength, was calculated by the following expression to assess the bonding between the carbon fiber filament and the polypropylene resin.

Interfacial shearing strength, $\tau(MPa)=F/\pi dl$ where F is the maximum pullout load, d is the diameter of the carbon fiber filament, and l is the drop diameter along the pulling direction.

[Wetting by Matrix Resin]

Of the samples prepared for the bonding test mentioned above, twenty samples having matrix resin drops of 100 to 200 μm in diameter were selected. The contact angles of those drops to the carbon fiber filament were measured and calculated into the average. Similar samples were prepared with carbon fiber filament taken out from size-free carbon fiber strand, and the average of the contact angles of the resin drops on the carbon fiber filament samples was calculated in the same manner and compared with the average of the contact angles mentioned above. The result was graded according to the criteria shown below to assess the wetting on sized carbon fiber with matrix resin.

A: resin drops on sized carbon fiber filament having an average contact angle smaller by 1 degree or more than the contact angle of the resin drops on the size-free carbon fiber filament B: resin drops on sized carbon fiber filament having an average contact angle similar to the contact angle on the size-free carbon fiber (with a difference below 1 degree)

C: resin drops on sized carbon fiber filament having an average contact angle greater by 1 degree or more than the contact angle on the size-free carbon fiber Example of Production 1

In a reactor charged with nitrogen gas, 950 parts of dimethyl isophthalate, 1000 parts of diethylene glycol, 0.5 parts of zinc acetate and 0.5 parts of antimony trioxide were placed, and transesterification was conducted at a temperature ranging from 140 deg.C. to 220 deg.C. for 3 hours. Then 30 parts of sodium 5-sulfoisophthalate was added and esterification was conducted at a temperature ranging from 220 deg.C. to 260 deg.C. for 1 hour followed with condensation reaction under reduced pressure at a temperature ranging from 240 deg.C. to 270 deg.C. for 2 hours. The components of the resultant aromatic polyester resin determined in an analysis with NMR are as follows.

Isophthalic acid: 49 mol %
Diethylene glycol: 50 mol %
Sodium 5-sulfoisophthalate: 1 mol %

Then 200 parts of the resultant aromatic polyester resin and 100 parts of ethylene glycol monobutyl ether are placed in an emulsification device and agitated at a temperature ranging from 150 deg.C. to 170 deg.C. to be homogenized. Then 700 parts of water was gradually added with agitation to make PE-1, an aqueous emulsion of the aromatic polyester resin containing 20 wt % of the nonvolatile components.

Example of Production 2

In a reactor charged with nitrogen gas, 760 parts of dimethyl terephthalate, 190 parts of dimethyl isophthalate, 750 parts of ethylene glycol, 250 parts of diethylene glycol, 0.5 parts of zinc acetate and 0.5 parts of antimony trioxide were placed, and transesterification was conducted at a temperature ranging from 140 deg.C. to 220 deg.C. for 3 hours. Then 30 parts of sodium 5-sulfoisophthalate was added and esterification was conducted at a temperature ranging from 220 deg.C. to 260 deg.C. for 1 hour followed with condensation reaction under reduced pressure at a temperature ranging from 240 deg.C. to 270 deg.C. for 2 hours. The components of the resultant aromatic polyester resin determined in an analysis with NMR are as follows.

Terephthalic acid: 39 mol %
Isophthalic acid: 10 mol %
Ethylene glycol: 40 mol %
Diethylene glycol: 10 mol %
Sodium 5-sulfoisophthalate: 1 mol %

Then 200 parts of the resultant aromatic polyester resin and 100 parts of ethylene glycol monobutyl ether are placed in an emulsification device and homogenized with agitation at a temperature ranging from 150 deg.C. to 170 deg.C. Then 700 parts of water was gradually added with agitation to make PE-2, an aqueous emulsion of the aromatic polyester resin containing 20 wt % of the nonvolatile components.

Example of Production 3

In a reactor charged with nitrogen gas, 650 parts of dimethyl terephthalate, 110 parts of ethylene glycol, 1160 parts of tetramethylene glycol, 0.5 parts of zinc acetate and 0.5 parts of antimony trioxide were placed, and transesterification was conducted at a temperature ranging from 140 deg.C. to 220 deg.C. for 3 hours. Then 60 parts of sodium 5-sulfoisophthalate and 340 parts of adipic acid were added and esterification was conducted at a temperature ranging from 220 deg.C. to 260 deg.C. for 1 hour followed with condensation reaction under reduced pressure at a temperature ranging from 240 deg.C. to 270 deg.C. for 2 hours. The components of the resultant aromatic polyester resin determined in an analysis with NMR are as follows.

Terephthalic acid: 28.5 mol %
Adipic acid: 19.5 mol %
Ethylene glycol: 6 mol %
Tetramethylene glycol: 44 mol %
Sodium 5-sulfoisophthalate: 2 mol %

Then 200 parts of the resultant aromatic polyester resin and 100 parts of ethylene glycol monobutyl ether are placed in an emulsification device and homogenized with agitation at a temperature ranging from 150 deg.C. to 170 deg.C. Then 700 parts of water was gradually added with agitation to make PE-3, an aqueous emulsion of the aromatic polyester resin containing 20 wt % of the nonvolatile components.

Example of Production 4

In a reactor charged with nitrogen gas, 498 parts of terephthalic acid, 332 parts of isophthalic acid, 248 parts of ethylene glycol, 106 parts of diethylene glycol, 45 parts of tetramethylene glycol and 0.2 parts of dibutyl tin oxide were placed, and esterification was conducted at a temperature ranging from 190 deg.C. to 240 deg.C. for 10 hours to produce an aromatic polyester polyol. Then 1000 parts of the aromatic polyester polyol was dehydrated under reduced pressure at 120 deg.C. and cooled down to 80 deg.C. Then 680 parts of methylethyl ketone was added to the aromatic polyester polyol and the mixture was agitated to dissolve the aromatic polyester polyol. Subsequently, 218 parts of isophorone diisocyanate and 67 parts of 2,2-dimethylol propionic acid as a chain extender were added and urethane reaction was conducted at 70 deg.C. for 12 hours. After the reaction, the product was cooled down to 40 deg.C. and neutralized with 97 parts of 13.6-% aqueous ammonia, and 2950 parts of water was added to make an aqueous emulsion. The resultant aqueous emulsion was heated up to 65 deg.C. under reduced pressure to remove methylethyl ketone, and the amount of the water in the aqueous emulsion was adjusted to make PU-1, an aqueous emulsion of the aromatic polyester-polyurethane resin containing 30 wt % of the nonvolatile components.

Example of Production 5

In a reactor charged with nitrogen gas, 332 parts of terephthalic acid, 332 parts of isophthalic acid, 146 parts of adipic acid, 258 parts of ethylene glycol, 106 parts of diethylene glycol, 52 parts of neopentyl glycol and 0.2 parts of dibutyl tin oxide were placed, and esterification was conducted at a temperature ranging from 190 deg.C. to 240 deg.C. for 10 hours to produce an aromatic polyester polyol. Then 1000 parts of the aromatic polyester polyol was dehydrated under reduced pressure at 120 deg.C. and cooled down to 80 deg.C., and 680 parts of methylethyl ketone was added to dissolve the aromatic polyester polyol with agitation. Subsequently, 160 parts of hexamethylene diisocyanate and 67 parts of 2,2-dimethylol propionic acid as a chain extender were added and urethane reaction was conducted at 70 deg.C. for 12 hours. After the reaction, the product was cooled down to 40 deg.C. and neutralized with 97 parts of 13.6-% aqueous ammonia, and 2870 parts of water was added to make an aqueous emulsion. The resultant aqueous emulsion was heated up to 65 deg.C. under reduced pressure to remove methylethyl ketone, and the amount of the water in the aqueous emulsion was adjusted to make PU-2, an aqueous emulsion of the aromatic polyester-polyurethane resin containing 30 wt % of the nonvolatile components.

Example of Production 6

In a reactor charged with nitrogen gas, 730 parts of adipic acid, 495 parts of tetramethylene glycol and 0.2 parts of dibutyl tin oxide were placed, and esterification was conducted at a temperature ranging from 190 deg.C. to 240 deg.C. for 10 hours to produce an aliphatic polyester polyol. Then 1000 parts of the aliphatic polyester polyol was dehydrated under reduced pressure at 120 deg.C. and cooled down to 80 deg.C., and 680 parts of methylethyl ketone was added to dissolve the aliphatic polyester polyol with agitation. Subsequently, 60 parts of polyethylene glycol (MW 600), 180 parts of hexamethylene diisocyanate and 67 parts of 2,2-dimethylol propionic acid as a chain extender were added and urethane reaction was conducted at 70 deg.C. for 12 hours. After the reaction, the product was cooled down to 40 deg.C. and neutralized with 97 parts of 13.6-% aqueous ammonia, and 2870 parts of water was added to make an aqueous emulsion. The resultant aqueous emulsion was heated up to 65 deg.C. under reduced pressure to remove methylethyl ketone, and the amount of the water in the aqueous emulsion was adjusted to make PU-3, an aqueous emulsion of the aromatic polyester-polyurethane resin containing 30 wt % of the nonvolatile components.

Example of Production 7

In a reactor, 234 parts of a bisphenol A epoxy resin (JER™ 1002, produced by Japan Epoxy Resin Ltd.) and 60 parts of ethylene glycol monoisopropyl ether were placed, melted by heating at 90 to 110 deg.C., and homogenized with agitation. Then 41 parts of diethanol amine was added with agitation and amine addition was conducted at 90 to 110 deg.C. for 2 hours. Subsequently, 22 parts of acetic acid was gradually added to neutralize the adduct, and the neutralization product was cooled down to 70 to 80 deg.C. Then 643 parts of water was gradually added to the neutralization product to make EP-1, an aqueous emulsion of the amine-modified aromatic epoxy resin containing 30 wt % of the nonvolatile components.

Example of Production 8

In a reactor, 223 parts of a bisphenol A epoxy resin (JER™ 1001, produced by japan Epoxy Resin Ltd.) and 35 parts of ethylene glycol monoisopropyl ether were placed, melted by heating at 90 to 110 deg.C., and homogenized with agitation. Then 52 parts of diethanol amine was added with agitation and amine addition was conducted at 90 to 110 deg.C. for 2 hours. Subsequently, 28 parts of acetic acid was gradually added to neutralize the adduct, and the neutralization product was cooled down to 70 to 80 deg.C. Then 662 parts of water was gradually added to the neutralization product to make EP-2, an aqueous emulsion of the amine-modified aromatic epoxy resin containing 30 wt % of the nonvolatile components.

Example of Production 9

In an autoclave equipped with an agitator, 222 parts of a polypropylene resin modified with maleic anhydride (graft copolymer of 95 wt % of propylene and 5 wt % of maleic anhydride, with weight average molecular weight of 30000), 52 parts of POE (8) oleyl ether and 26 parts of diethanol amine were placed and heated to 170 to 180 deg.C. with agitation under nitrogen flux. Then 700 parts of water was gradually added with agitation and the mixture was homogenized with agitation at 170 to 180 deg.C. for 2 hours. Then the mixture was cooled down to room temperature, and the amount of the water was adjusted to make PP-1, an aqueous emulsion of the modified polyolefin resin containing 30 wt % of the nonvolatile components.

Example of Production 10

In an autoclave equipped with an agitator, 200 parts of a polypropylene resin modified with maleic anhydride (graft copolymer of 97.5 wt % of ethylene and 2.5 wt % of maleic anhydride, with weight average molecular weight of 10000), 93 parts of POE (15) oleyl ether and 8 parts of potassium hydroxide were placed and heated to 170 to 180 deg.C. with agitation under nitrogen flux. Then 699 parts of water was gradually added with agitation and the mixture was homogenized with agitation at 170 to 180 deg.C. for 2 hours. Then the mixture was cooled down to room temperature, and the amount of the water was adjusted to make PP-2, an aqueous emulsion of the modified polyolefin resin containing 30 wt % of the nonvolatile components.

Example of Production 11

In an emulsification device, 153 parts of a bisphenol A epoxy resin (JER™ 1001, produced by Japan Epoxy Resin Ltd.), 102 parts of a liquid bisphenol A epoxy resin (JER™ 828, produced by Japan Epoxy Resin Ltd.) and 45 parts of POE (40) tristyrenated phenyl ether were placed, melted by heating at 90 to 110 deg.C., and homogenized with agitation. Then the product was cooled down to 70 to 80 deg.C. and 700 parts of water was gradually added being agitated with a homogenizer to make EPEM-1, an aqueous emulsion of the epoxy resin containing 30 wt % of the nonvolatile components.

The aqueous emulsions in the examples of production from 1 to 11 were heated at 105 deg.C. to remove solvents and made into absolute dry matters. The glass transition temperatures and endothermic heats of fusion of those dry matters were determined with a DSC, and the results are shown in Table 1.

TABLE 1

| Polymer component | Glass transition temperature, Tg (deg. C.) | Endothermic heat of fusion (J/g) |
|---|---|---|
| PE-1 | 26 | 0 (no peaks) |
| PE-2 | 68 | 0 (no peaks) |
| PE-3 | −29 | 13.2 |
| PU-1 | 56 | 0 (no peaks) |
| PU-2 | 33 | 0 (no peaks) |
| PU-3 | −42 | 20.2 |
| EP-1 | 31 | 0 (no peaks) |
| EP-2 | 30 | 0 (no peaks) |
| PP-1 | −20 | 54.8 |
| PP-2 | 29 | 86.8 |
| EPEM-1 | −0.8 | 0 (no peaks) |

Example 1

The aqueous emulsion of the aromatic polyester resin in the example of production 1, PE-1, was diluted with water to be made into a size emulsion containing 15 weight percent of the nonvolatile components. A carbon fiber strand (800 tex, 12000 filament count) free of sizing agents was immersed in and impregnated with the size emulsion, dried in hot air at 105 deg.C. for 15 minutes, and made into a sized carbon fiber strand applied with the sizing agent in the theoretical amount of 5%. The wetting on the sized carbon fiber strand with a matrix resin and bonding of the sized carbon fiber strand with a matrix resin were assessed in the methods mentioned above, and the results are shown in Table 2.

Examples 2 to 15 and Comparative Examples 1 to 6

Sized carbon fiber strands were prepared in the same manner as that in Example 1, except that the size emulsions containing 15 wt % of nonvolatile components were prepared with the nonvolatile components shown in Tables 2 to 4. The properties of the sized carbon fiber strands are shown in Tables 2 to 4.

TABLE 2

| | | Examples | | | | | | | |
|---|---|---|---|---|---|---|---|---|---|
| | | 1 | 2 | 3 | 4 | 5 | 6 | 7 | 8 |
| Nonvolatile components of sizing agent (%) | PE-1 | 100 | | | | | | | 70 |
| | PE-2 | | 100 | | | | | 50 | |
| | PU-1 | | | 100 | | | | | |
| | PU-2 | | | | 100 | | | | |
| | EP-1 | | | | | 100 | | | |
| | EP-2 | | | | | | 100 | 50 | 30 |
| Bonding (MPa) | | 14.8 | 15.0 | 16.2 | 15.7 | 14.6 | 14.3 | 16.5 | 16.8 |
| Wetting by matrix resin | | A | A | A | A | A | A | A | A |

TABLE 3

| | | Examples | | | | | | |
|---|---|---|---|---|---|---|---|---|
| | | 9 | 10 | 11 | 12 | 13 | 14 | 15 |
| Nonvolatile components of sizing agent (%) | PE-1 | | | 60 | | | | |
| | PE-2 | | | | | | 40 | |
| | PU-1 | 50 | | | 50 | | | 35 |
| | PU-2 | | 60 | | | | | |
| | EP-1 | | 40 | | | | | |
| | EP-2 | 50 | | | 40 | 20 | 15 | |
| | PP-1 | | | 40 | 50 | 60 | 40 | 50 |
| Bonding (MPa) | | 17.5 | 17.9 | 18.7 | 18.5 | 19.2 | 19.8 | 20.1 |
| Wetting by matrix resin | | A | A | A | A | A | A | A |

TABLE 4

| | | Comparative examples | | | | | |
|---|---|---|---|---|---|---|---|
| | | 1 | 2 | 3 | 4 | 5 | 6 |
| Nonvolatile components of sizing | PE-1 | | | | | | 5 |
| | PE-3 | 100 | | | | | |
| | PU-3 | | 100 | | | | |

TABLE 4-continued

| | | Comparative examples | | | | | |
|---|---|---|---|---|---|---|---|
| | | 1 | 2 | 3 | 4 | 5 | 6 |
| agent (%) | PP-1 | | | 100 | | | 95 |
| | PP-2 | | | | 100 | | |
| | EPEM-1 | | | | | 100 | |
| Bonding (MPa) | | 8.9 | 10.6 | 11.9 | 10.7 | 12.6 | 12.0 |
| Wetting by matrix resin | | B | C | B | B | C | B |

As clearly shown in Tables 1 to 4, the sizing agents in Examples resulted in better wetting of sized carbon fibers by matrix resins and bonding between sized carbon fibers and matrix resins than the sizing agents in Comparative examples.

INDUSTRIAL APPLICABILITY

Fiber reinforced composites manufactured by reinforcing thermoplastic matrix resins with carbon fiber are applied to various uses including automotive application, aerospace application, sporting and leisure goods, and general industries. The sizing agent of the present invention is preferably applied to carbon fiber which reinforces thermoplastic matrix resins.

What is claimed is:

1. A sizing agent for carbon fiber used for reinforcing a thermoplastic matrix resin, the sizing agent essentially comprising:
   a polymer component having a glass transition temperature at least 20 deg C. and exhibiting no endothermic peaks of 3 J/g or more indicating an endothermic heat of fusion due to crystalline melting in a determination with a differential scanning calorimeter;
   wherein the weight ratio of the polymer component constitutes from 10 to 100 wt % of the nonvolatile components of the sizing agent;
   wherein the polymer component is at least one component selected from the group consisting of an aromatic polyester resin, aromatic polyester-polyurethane resin and amine-modified aromatic epoxy resin;
   wherein the aromatic polyester-polyurethane resin is a polymer produced by addition polymerization of an aromatic polyester polyol and polyisocyanate;
   wherein the amine-modified aromatic epoxy resin is a reaction product of an aromatic epoxy compound and hydroxyl-group-containing amine compound with the ratio of the hydroxyl-group-containing amine compound ranging from 1.0 to 2.0 mol equivalent to the epoxy groups of the aromatic epoxy compound,
   wherein the aromatic polyester resin is a copolymer of polycarboxylic acid components, the polycarboxylic acid components including a polycarboxylic acid or its anhydride and a polyol,
   wherein an aromatic dicarboxylic acid constitutes from 40 to 99 mole percent of all of the polycarboxylic acid components,
   wherein a sulfonate salt-containing aromatic dicarboxylic acid constitutes 1 to 10 mole percent of all of the polycarboxylic acid components, and
   wherein the polyol includes diethylene glycol.

2. A sizing agent for carbon fiber according to claim 1, further comprising a modified polyolefin resin, wherein the polymer component constitutes 10 to 90 wt % and the modified polyolefin resin constitutes 10 to 90 wt % of the nonvolatile components of the sizing agent.

3. A sizing agent for carbon fiber according to claim 2, wherein the thermoplastic matrix resin is a polyolefin resin.

4. A sizing agent for carbon fiber according to claim 2, further comprising water, wherein the polymer component is in a state dispersed or dissolved in the water.

5. A sizing agent for carbon fiber according to claim 2, wherein the aromatic polyester resin has a hydrophilic group in its molecular framework.

6. A sizing agent for carbon fiber according to claim 2, wherein the aromatic polyester-polyurethane resin has a hydrophilic group in its molecular framework.

7. A sized carbon fiber strand comprising a base fiber strand, and the sizing agent for carbon fiber in claim 2 applied to the base fiber strand.

8. A sizing agent for carbon fiber according to claim 1, wherein the thermoplastic matrix resin is a polyolefin resin.

9. A sizing agent for carbon fiber according to claim 8, further comprising water, wherein the polymer component is in a state dispersed or dissolved in the water.

10. A sizing agent for carbon fiber according to claim 8, wherein the aromatic polyester resin has a hydrophilic group in its molecular framework.

11. A sizing agent for carbon fiber according to claim 8, wherein the aromatic polyester-polyurethane resin has a hydrophilic group in its molecular framework.

12. A sized carbon fiber strand comprising a base fiber strand, and the sizing agent for carbon fiber in claim 8 applied to the base fiber strand.

13. A sizing agent for carbon fiber according to claim 1, further comprising water, wherein the polymer component is in a state dispersed or dissolved in the water.

14. A sizing agent for carbon fiber according to claim 1, wherein the aromatic polyester resin has a hydrophilic group in its molecular framework.

15. A sizing agent for carbon fiber according to claim 1, wherein the aromatic polyester-polyurethane resin has a hydrophilic group in its molecular framework.

16. A sized carbon fiber strand comprising a base fiber strand, and the sizing agent for carbon fiber in claim 1 applied to the base fiber strand.

17. A fiber-reinforced composite comprising a thermoplastic matrix resin and the carbon fiber strand in claim 16.

18. A sizing agent for carbon fiber according to claim 1, wherein the aromatic polyester resin is a copolymer of a polycarboxylic acid or its anhydride and a polyol, the polyol includes diols and polyols having at least three functional groups, the diols include ethylene glycol, diethylene glycol, propylene glycol, 1,3-propane diol, 1,4-butane diol, 1,6-hexane diol, neopentyl glycol, tetramethylene glycol, 1,4-cyclohexane diol, 1,-4-cyclohexane dimethanol, resorcin, hydroquinone and bisphenolA, and the polyols have at least three functional groups including trimethylol propane, glycerin and pentaerythritol.

* * * * *